United States Patent [19]

De Choudhury

[11] Patent Number: 4,553,855

[45] Date of Patent: Nov. 19, 1985

[54] DAMPER AND SPRING SHAFT SUPPORT ASSEMBLY

[75] Inventor: Pranabesh De Choudhury, Greensburg, Pa.

[73] Assignee: Elliott Turbomachinery Company, Inc., Jeannette, Pa.

[21] Appl. No.: 662,006

[22] Filed: Oct. 18, 1984

[51] Int. Cl.[4] .......................... F16C 27/02; F16C 32/06
[52] U.S. Cl. ...................................... 384/99; 384/215; 384/535
[58] Field of Search .......... 384/99, 106, 125, 215–222, 384/312, 535, 536, 581, 582

[56] References Cited

U.S. PATENT DOCUMENTS

| 2,403,489 | 7/1946 | Birmann | 384/215 |
| 3,097,895 | 7/1963 | Matt | 384/215 X |
| 3,394,971 | 7/1968 | Bazeley | 384/535 |
| 3,554,619 | 1/1971 | Irwin | 384/536 |
| 3,979,155 | 9/1976 | Sood et al. | 384/117 |
| 3,994,541 | 11/1976 | Geary et al. | 384/117 |
| 4,027,931 | 6/1977 | Streifert | 384/215 X |
| 4,213,661 | 7/1980 | Marmol | 384/99 |

FOREIGN PATENT DOCUMENTS

| 1072020 | 12/1959 | Fed. Rep. of Germany | 384/535 |
| 1309836 | 3/1973 | United Kingdom | 384/535 |
| 186226 | 10/1966 | U.S.S.R. | 384/215 |
| 817346 | 3/1981 | U.S.S.R. | 384/535 |

OTHER PUBLICATIONS

"Analysis of High Load Dampers", NASA Report Contract NA53-22518, by S. T. Bhat et al., pp. 13, 14, 43–46.

Primary Examiner—Stuart S. Levy
Assistant Examiner—Thomas R. Hannon
Attorney, Agent, or Firm—Robert P. Hayter

[57] ABSTRACT

A support assembly for a rotating shaft utilizing an annular spring is disclosed. A series of support rods are spaced on the interior and exterior sides of an annular spring to define spring segments which act as a spring for supporting the journal. A squeeze film damper cavity may be incorporated either as part of the spring support structure or separately within the assembly to provide the necessary damping.

5 Claims, 4 Drawing Figures

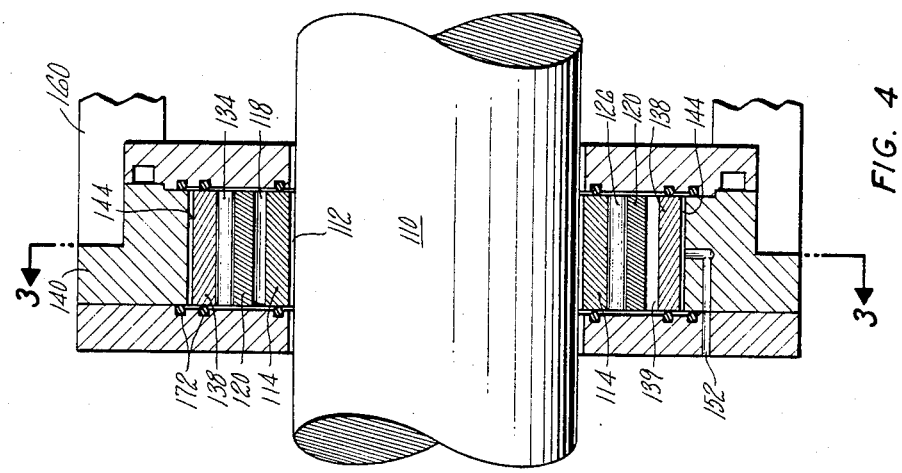
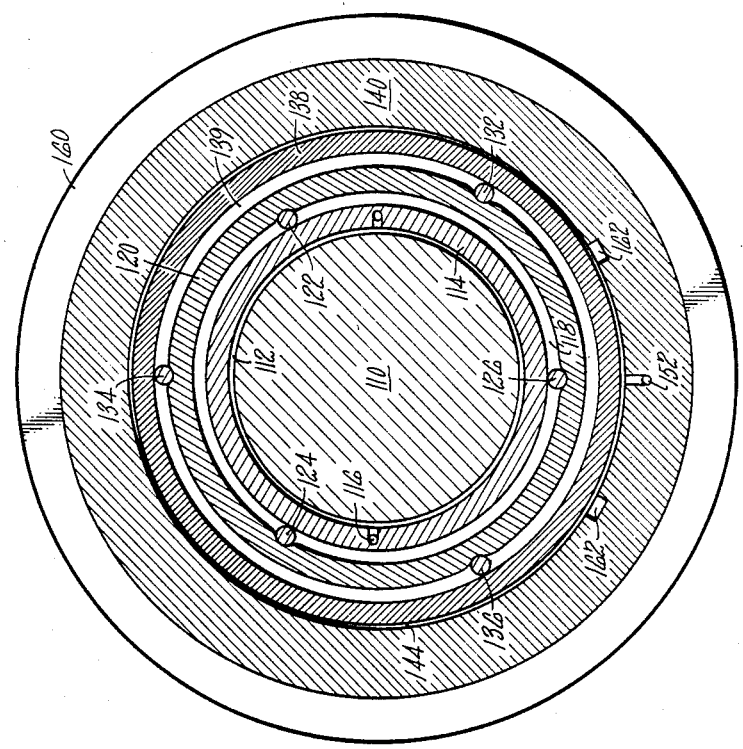

DAMPER AND SPRING SHAFT SUPPORT ASSEMBLY

BACKGROUND OF THE INVENTION

This invention relates to a support assembly for a rotating shaft. More particularly the invention concerns utilizing an annular spring in conjunction with a squeeze film type damper to secure a rotating shaft.

It has been found desirable to secure a rotating shaft of a turbomachine, such as a high-speed gas compressor or other similar device, such that oscillatory or vibratory motion of the shaft may be resisted and damped. Many types of springs have been utilized to resist shaft displacement to maintain the shaft in the desired position and various types of damping have been incorporated therewith. It is known to utilize the squeeze film damper to effect damping to allow operation of a rotor above its critical speed. It is also known to use spaced, segmented springs contacting both the bearing and the support structure for absorbing oscillatory motion of the shaft.

The present invention concerns utilizing an annular spring spaced about a bearing. A series of axially extending rods are positioned between the spring and the bearing and between the spring and the support structure such that the annular spring is effectively divided into a plurality of spaced spring segments. The sequeeze film damper cavity is either provided exterior of the spring or incorporated into the support structure of the spring to achieve the necessary damping to allow operation above various critical speeds.

SUMMARY OF THE INVENTION

It is an object of the present invention to provide a spring for supporting a rotating shaft journal.

It is a further object of the present invention to provide a damper and spring shaft support assembly for use in high speed rotating turbomachinery.

It is a still further object of the present invention to provide an annular spring capable of being divided into a plurality of separate spring segments for appropriately supporting a shaft.

It is a yet further object of the present invention to incorporate a squeeze film damper into a spring support arrangement.

It is a still further object of the present invention to provide an economical, reliable and easy to assemble damper and spring shaft support assembly.

Other objects will be apparent from the description to follow and the appended claims.

These and other objects of the present invention are achieved according to a preferred embodiment by the provision of a support assembly for a rotating shaft which includes a generally annular bearing in which the shaft is secured, means for supplying oil between the bearing and the shaft, an annular retainer mounted about the bearing defining a void therebetween, an annular spring located within the void defined between the retainer and the bearing for resisting displacement of the shaft, first spring supports located between the bearing and the spring for transmitting forces therebetween, second spring supports located between the spring and the retainer for transmitting forces therebetween and squeeze film damper means located within the void for damping motion of the shaft.

Additionally there is disclosed an annular spring support structure for use in resisting motion of a rotating shaft secured in a bearing which includes an annular spring mounted about the bearing, first support rods located between the bearing and the spring for transmitting forces therebetween, a support retainer positioned about the spring, and second support rods located between the spring and the retainer for transmitting forces therebetween.

BRIEF DESCRIPTION OF THE DRAWINGS

FIG. 3 is a radial, sectional view taken at line III—III of FIG. 4 of a damper and spring shaft support assembly.

FIG. 4 is an axial, sectional view of the damper and spring shaft support assembly of FIG. 3.

DESCRIPTION OF THE PREFERRED EMBODIMENT

The apparatus as described herein will refer to two separate embodiments using an annular spring and a series of three inner and outer rods. The number of support rods and the various positioning thereof to achieve the desired spring effect is a matter of design choice. Additionally the selection of the size of the spring and its stiffness to tune the spring to the appropriate critical frequencies is a choice of an individual designer for a specific machine.

Figure 2:
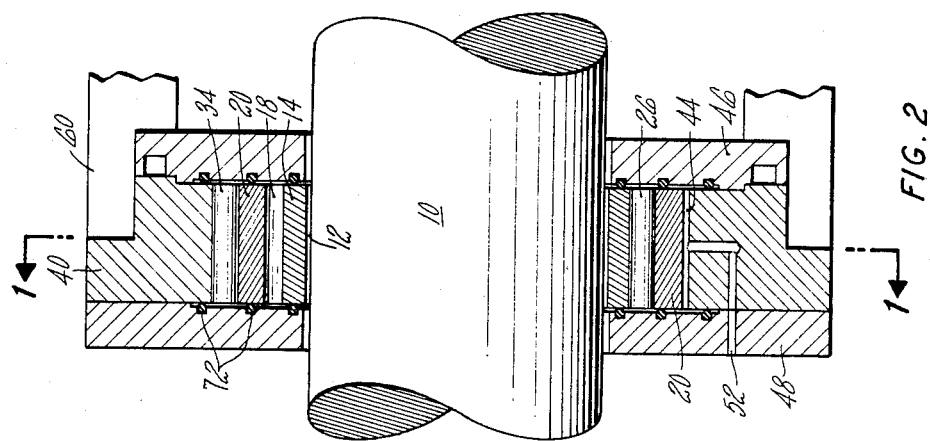
FIG. 2 is an axial sectional view of the damper and spring shaft support assembly of FIG. 1.
Figure 1:
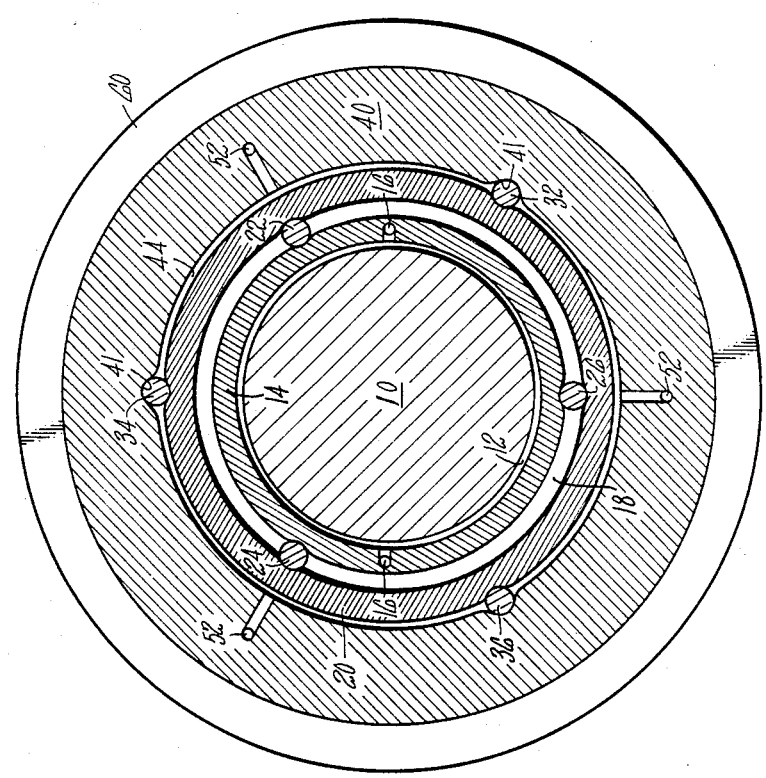
FIG. 1 is a radial sectional view taken at line I—I of FIG. 2 of a damper and spring shaft support assembly.

Referring first to FIGS. 1 and 2 there may be seen a damper and spring shaft support assembly. Shaft or journal 10 is shown in the center of the Figures and is supported by bearing 14 shown as a solid fixed bearing. Bearing 14 could, of couse, be a tilt shoe or other more complex bearing than the bearing shown. Fluid film 12 is shown located between bearing 14 and journal 10 for supporting the journal during rotating movement.

Retainer 40 is in configuration and is located adjacent the exterior portion of FIG. 2 as is the end of the turbomachine wall 60. Located in the void between the bearing and the retainer is spring 20. Spring 20 is annular in configuration and is made from any conventional spring material having an appropriate modulus of elasticity. Support rods 22, 24, 26 are shown spaced equally about a void formed between the bearing and the spring. This void is labeled spring support cavity 18. Coacting support rods 32, 34, 36 are likewise shown equally spaced about the exterior surface of spring 20 to engage both spring 20 and retainer 40. It can be observed from the Figures that the outer support rods 32, 34 and 36 are offset from the inner support rods such that the segment of spring defined between inner support rods is bisected by the outer support rod. The outer support rod is shown supported within spring support groove 41 in the retainer for securing the rod in position. Additionally, grooves may be provided in the spring and the bearing for supporting the remaining rods in position. A bearing antirotation pin (not shown) is used to prevent rotation of the bearing and thereby to prevent rotation of the spring, retainer and the entire structure. Oil inlet 52 is shown for supplying oil to squeeze film damper cavity 44 formed between the spring and the retainer. The outer support rods 32, 34 and 36 are located within the squeeze film damper cavity. Additionally oil inlet 16 is shown for supplying oil to the bearing-journal interface.

FIG. 2 is an axial, sectional view of the damper and spring shaft support assembly shown in FIG. 1. As may be seen in FIG. 2, journal 10 is located at the center and supported by fluid film 12. Bearing 14 is shown supporting the fluid film. Support rod 26 is shown connected between spring 20 and bearing 14 at the bottom half of FIG. 2. Additionally oil inlet 52 is shown extending through side wall 48 to supply oil to the squeeze film damper cavity 44. Side walls 46 and 48 are shown on opposite sides of retainer 40. O-ring seals 72 are shown for preventing fluid flow between adjacent cavities. Additionally an end wall of the turbomachine referenced 60 is shown locating the turbomachine relative to the support structure.

At the top portion of the view of FIG. 2, it may be seen that there is a void between spring 20 and bearing 14. Additionally support rod 34 is shown mechanically connecting spring 20 and retainer 40.

A different embodiment of the herein invention is shown in FIGS. 3 and 4. In this embodiment a separate spring support retainer is utilized to position the outer spring support rods and to provide a squeeze film damper cavity. Otherwise the two embodiments are substantially similar. FIGS. 3 and 4 use the reference numerals of FIGS. 1 and 2 plus a one in the hundreds column to clearly point out similar components. In FIG. 3, journal 110 is mounted for rotational movement within bearing 114 which defines a fluid film 112 therebetween. Oil is supplied to form the fluid film through oil inlet 116. Mechanical spring 120 is shown having a series of inner support rods 122, 124, 126 located between the spring and the bearing and a series of outer support rods 132, 134 and 136 located between the spring and spring support retainer 138. Spring support retainer 138 is annular in configuration and defines about the exterior surface thereof, a surface of a squeeze film damper cavity 144 to which oil is supplied through oil inlet 152. Retainer 40 is mounted about the squeeze film damper cavity and defines the opposite cavity surface. In addition two slots 62 are provided at the bottom of the assembly into which springs may be mounted for acting to center the entire assembly.

FIG. 4 is an axially extending sectional view of FIG. 3. Again it may be seen that journal 110 is located in the center and supported via oil film 112 maintained between the journal and bearing 114. Located at the bottom portion of the drawing it may be seen that support rod 126 supports mechanical spring 120 from bearing 114. Additionally a spring retention cavity 139 is located between the spring and spring support retainer 138. Fluid from film damper cavity 144 is located between retainer 140 and the spring support retainer. Oil inlet 152 for supplying oil to the squeeze film damper cavity is shown.

At the top portion of FIG. 4 it may be seen that there is a spring support cavity 118 between the bearing and spring 120. Between spring 120 and spring support retainer 138 is shown support rod 134. Additionally the fluid film damper cavity 144 is shown located between the spring support retainer and the retainer.

The invention herein has been described with reference to a particular embodiment. It is to be understood by those skilled in the art that variations and modifications can be effected within the spirit and scope of the invention.

I claim:

1. A support assembly for a rotating shaft which comprises:
   a generally annular bearing in which the shaft is secured;
   means for supplying oil between the bearing and the shaft;
   an annular retainer mounted about the bearing and defining a void therebetween;
   an annular single piece spring located within the void defined between the retainer and the bearing for resisting displacement of the shaft;
   first spring support means including a series of axially oriented rods located between the bearing and the spring for transmitting forces therebetween;
   second spring support means including a series of axially oriented rods located between the spring and the retainer for transmitting forces therebetween;
   wherein said annular retainer further defines means for securing the second spring support means in the desired position; and
   squeeze film damper means located within the void for damping motion of the shaft.

2. The apparatus as set forth in claim 1 wherein the first spring supports are secured in position by complementary grooves defined by the spring and the bearing.

3. The apparatus as set forth in claim 1 wherein the axially extending rods of the first spring support means are equally spaced from each other and wherein the number of rods of the second spring support means is identical to the number of rods of the first spring support means, said rods of the second spring support means being positioned on the opposite side of the spring from the rods of the first spring support means at the midpoint of the arc extending between adjacent rods of the first spring support means.

4. The apparatus as set forth in claim 1 wherein the rods of the second spring supports are located within the squeeze film damper means.

5. The apparatus as set forth in claim 1 and further comprising an annular spring support retainer positioned between the spring and the retainer, said second spring supports being positioned between the spring and the spring support retainer and said damper means being positioned between the spring support retainer and the retainer.

* * * * *